United States Patent
Yang et al.

(10) Patent No.: US 8,504,811 B2
(45) Date of Patent: Aug. 6, 2013

(54) SYSTEM AND METHOD OF ACCESSING BIOS CHANGE SUMMARY INFORMATION WITHIN A BIOS OPERATING ENVIRONMENT

(75) Inventors: Chih-Cheng Yang, Taipei (TW); Yung Shun Liang, Taipei (TW)

(73) Assignee: Dell Products, LP, Round Rock, TX (US)

( * ) Notice: Subject to any disclaimer, the term of this patent is extended or adjusted under 35 U.S.C. 154(b) by 1195 days.

(21) Appl. No.: 12/124,244

(22) Filed: May 21, 2008

(65) Prior Publication Data

US 2009/0292910 A1 Nov. 26, 2009

(51) Int. Cl.
G06F 9/00 (2006.01)
G06F 15/177 (2006.01)

(52) U.S. Cl.
USPC .................................................. 713/2; 713/1

(58) Field of Classification Search
USPC ......................................................... 713/1, 2
See application file for complete search history.

(56) References Cited

U.S. PATENT DOCUMENTS

| | | | | |
|---|---|---|---|---|
| 5,579,522 A * | 11/1996 | Christeson et al. | ............... | 713/2 |
| 5,864,480 A * | 1/1999 | Ladd | ............... | 700/83 |
| 6,065,116 A * | 5/2000 | Isaacson et al. | ................ | 713/1 |
| 6,115,720 A * | 9/2000 | Bleizeffer et al. | .................... | 1/1 |
| 6,748,524 B1 * | 6/2004 | Stepp et al. | ........................ | 713/1 |
| 7,370,238 B2 * | 5/2008 | Billick et al. | ................... | 714/36 |
| 2005/0039081 A1 * | 2/2005 | Chang et al. | .................... | 714/36 |
| 2005/0102568 A1 * | 5/2005 | Billick et al. | ................... | 714/25 |
| 2005/0144432 A1 * | 6/2005 | Wu | ................... | 713/2 |
| 2006/0080140 A1 * | 4/2006 | Buttner et al. | .................... | 705/2 |
| 2008/0209194 A1 * | 8/2008 | Prabakaran et al. | ............. | 713/1 |
| 2009/0287914 A1 * | 11/2009 | Shah et al. | ........................ | 713/1 |

* cited by examiner

Primary Examiner — Huynh Kim
Assistant Examiner — Zahid Choudhury
(74) Attorney, Agent, or Firm — Larson Newman, LLP

(57) ABSTRACT

A system and method of accessing basic input output system (BIOS) change summary information within a BIOS operating environment is disclosed. According to an aspect, a basic input output system (BIOS) set-up interface is disclosed. The BIOS set-up interface includes a navigation routine accessible via a BIOS set-up menu and operable to initiate displaying a secondary user display interface. The BIOS set-up interface further includes a BIOS change summary interface accessible using the secondary display user interface and configured to display BIOS set-up changes made using the BIOS set-up menu.

19 Claims, 4 Drawing Sheets

SYSTEM AND METHOD OF ACCESSING BIOS CHANGE SUMMARY INFORMATION WITHIN A BIOS OPERATING ENVIRONMENT

FIELD OF THE DISCLOSURE

This disclosure relates generally to information handling systems, and more particularly, to a system and method of accessing basic input output system (BIOS) change summary information within a BIOS operating environment.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
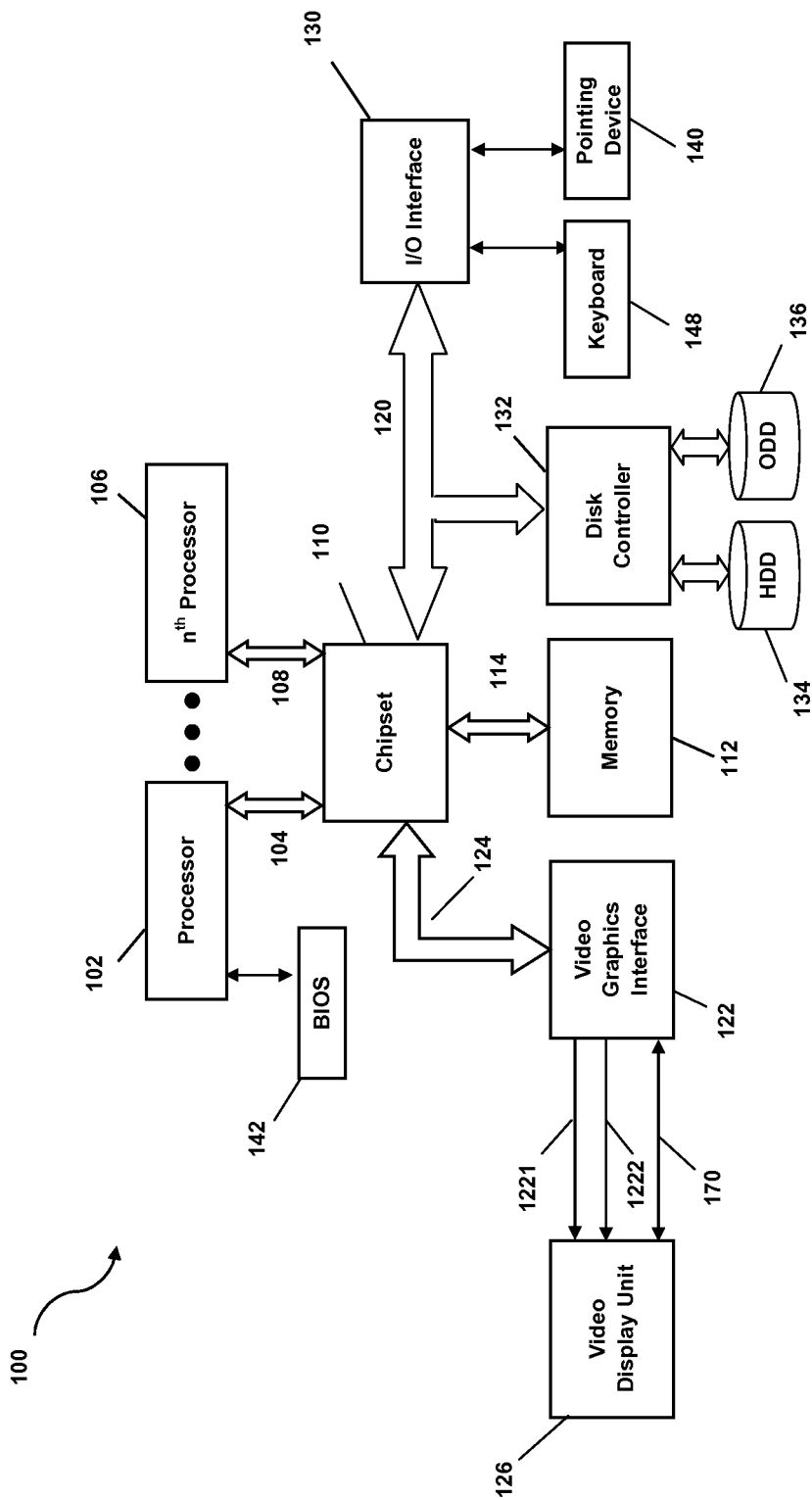
FIG. 1 illustrates a block diagram of an information handling system according to an aspect of the disclosure.

The following description in combination with the figures is provided to assist in understanding the teachings disclosed herein. The following discussion will focuses on specific implementations and embodiments. This focus is provided to assist in describing the teachings and should not be interpreted as a limitation on the scope or applicability of the teachings. However, other teachings can certainly be used in this application. The teachings can also be used in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

Portions of an information handling system, when referred to as a "device," a "module," or the like, can be configured as hardware, software (which can include firmware), or any combination thereof. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). Similarly, the device could be software, including firmware embedded at a device, such as a Pentium class or PowerPC™ brand processor, or other such device, or software capable of operating a relevant environment of the information handling system. The device could also be a combination of any of the foregoing examples of hardware or software. Note that an information handling system can include an integrated circuit or a board-level product having portions thereof that can also be any combination of hardware and software.

Devices or programs that are in communication with one another need not be in continuous communication with each other unless expressly specified otherwise. In addition, devices or programs that are in communication with one another may communicate directly or indirectly through one or more intermediaries.

Embodiments discussed below describe, in part, distributed computing solutions that manage all or part of a communicative interaction between network elements. In this context, a communicative interaction may be intending to send information, sending information, requesting information, receiving information, receiving a request for information, or any combination thereof. As such, a communicative interaction could be unidirectional, bidirectional, multi-directional, or any combination thereof. In some circumstances, a communicative interaction could be relatively complex and involve two or more network elements. For example, a communicative interaction may be "a conversation" or series of related communications between a client and a server—each network element sending and receiving information to and from the other. The communicative interaction between the network elements is not necessarily limited to only one specific form. A network element may be a node, a piece of hardware, software, firmware, middleware, another component of a computing system, or any combination thereof.

In the description below, a flow charted technique may be described in a series of sequential actions. Unless expressly stated to the contrary, the sequence of the actions and the party performing the actions may be freely changed without departing from the scope of the teachings. Actions may be added, deleted, or altered in several ways. Similarly, the actions may be re-ordered or looped. Further, although processes, methods, algorithms or the like may be described in a sequential order, such processes, methods, algorithms, or any combination thereof may be operable to be performed in alternative orders. Further, some actions within a process, method, or algorithm may be performed simultaneously during at least a point in time (e.g., actions performed in parallel), can also be performed in whole, in part, or any combination thereof.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single device is described herein, more than one device may be used in place of a single device. Similarly, where more than one device is described herein, a single device may be substituted for that one device.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

To the extent not described herein, many details regarding specific materials, processing acts, and circuits are conventional and may be found in textbooks and other sources within the computing, electronics, and software arts.

An information handling system and method of using it are described below. An exemplary, non-limiting system description is described before addressing methods of using it. Some of the functionality of modules within the system is described with the system. The utility of the system and its modules will become more apparent with the description of the methods that follow the description of the system and modules.

According to an aspect, a basic input output system (BIOS) set-up interface is disclosed. The BIOS set-up interface includes a navigation routine accessible via a BIOS set-up menu and operable to initiate displaying a secondary user display interface. The BIOS set-up interface further includes a BIOS change summary interface accessible using the secondary display user interface and configured to display BIOS set-up changes made using the BIOS set-up menu.

According to another aspect, a method of modifying a basic input output system (BIOS) set-up is disclosed. The method includes displaying a plurality of BIOS set-up options within a BIOS set-up menu, and detecting selection of a first option change using the BIOS set-up menu. The method further includes detecting a request to exit the BIOS set-up menu, and displaying a secondary selection window with the BIOS set-up menu. According to an aspect, the secondary selection window can include a BIOS change summary function. The method can also include detecting a selection of the BIOS change summary function, and accessing a listing including the first option change. The method can further include displaying the first option change within a BIOS change summary interface.

According to a further aspect, an information handling system is disclosed. The information handling system can include a processor operable to enable use of selected BIOS options configurable by a user, and a BIOS set-up stored within a memory accessible to the processor. In a particular form, the BIOS set-up including the selected BIOS options. The information handling system can also include a BIOS set-up interface configured to enable access to selected BIOS options using a BIOS change summary interface.

FIG. 1 illustrates a block diagram of an exemplary embodiment of an information handling system 100. The information handling system 100 can be a computer system such as a server, a desktop computer, a laptop computer, a rack of computers (e.g., networked servers), the like, or any combination thereof. After reading this specification, skilled artisans will appreciate that the information handling system can be configured to their particular needs or desires.

As illustrated in FIG. 1, the information handling system 100 can include a processor 102 connected to a host bus 104 and can further include additional processors generally designated as $N^{th}$ processor 106 connected to a host bus 108. The processors 102 and 106 can be separate physical processors, and in another embodiment, the processors 102 and 106 can be different cores within the same integrated circuit. The processor 102 can be connected to a chipset 110 via the host bus 104. Further, the processor 106 can be connected to the chipset 110 via the host bus 108. The chipset 110 can support multiple processors and can allow for simultaneous processing of multiple processors and support the exchange of information within information handling system 100 during multiple processing operations.

In an embodiment, the chipset 110 can be referred to as a memory hub or a memory controller. For example, the chipset 110 can include an Accelerated Hub Architecture (AHA) that uses a dedicated bus to transfer data between the processors 102 and 106. For example, the chipset 110 including an AHA-enabled chipset can include a memory controller hub and an input/output (I/O) controller hub. As a memory controller hub, the chipset 110 can function to provide access to the processor 102 using the host bus 104 and the processor 106 using the host bus 108. The chipset 110 can also provide a memory interface for accessing memory 112 using a host bus 114. In a particular embodiment, the host buses 104, 108, and 114 can be individual buses or part of the same bus. The chipset 110 can also provide bus control and handle transfers between the host buses 104, 108, and 114.

According to another aspect, the chipset 110 can be generally considered an application specific chipset that provides connectivity to various buses, and integrates other system functions. For example, the chipset 110 can be provided using an Intel®-brand Hub Architecture (IHA) chipset also that can include two parts, a Graphics and Accelerated Graphics Port (AGP) Memory Controller Hub (GMCH) and an I/O Controller Hub (ICH). For example, an Intel 820E, an 815E chipset, or any combination thereof, available from the Intel Corporation of Santa Clara, Calif., can provide at least a portion of the chipset 110. The chipset 110 can also be packaged as an application specific integrated circuit (ASIC).

The information handling system 100 can also include a video/graphic interface module 122 that can be connected to the chipset 110 using host bus 124. The video/graphic module 122 includes two or more video/graphic ports, such as video/graphics port 1221 and video/graphic port 1222, capable of providing image information substantially simultaneously to a common video/graphics display device 126 for substantially simultaneous display as described in greater detail herein. Also, each of the video/graphic ports 1221 and 1222 are capable of providing image information to separate video/graphic devices for substantially simultaneous display. The video/graphic display device 126 is also referred to herein as a display unit 126.

The display unit 126 can include one or more types of video/graphic display devices, such as a flat panel display (FPD) or other type of display device. In accordance with the present disclosure, the video/graphic interface module 122 can detect the presence of a cable adapter 170 and configure multiple video/graphic ports, such as DisplayPort video/graphic ports, to operate in tandem along with the cable adapter to implement a Dual-Link DVI video/graphic port.

The information handling system 100 can also include an I/O interface module 130 that can be connected via an I/O bus 120 to the chipset 110. The I/O bus 120 and the I/O interface 130 can include industry standard buses or proprietary buses and respective interfaces or controllers. In one form, a PCI bus can be operated at approximately 66 MHz and a PCI-Express bus can be operated at more than one (1) speed (e.g. 2.5 GHz and 5 GHz). PCI buses and PCI-Express buses can comply with industry standards for connecting and communicating between various PCI-enabled hardware devices. Other buses can also be used in association with, or independent of, the I/O bus 120 including, but not limited to, industry standard buses or proprietary buses, such as Industry Standard Architecture (ISA), Small Computer Serial Interface (SCSI), Inter-Integrated Circuit ($I^2C$), System Packet Interface (SPI), or Universal Serial buses (USBs).

In an alternate embodiment, the chipset 110 can be a chipset employing a Northbridge/Southbridge chipset configuration (not separately illustrated). For example, a Northbridge portion of the chipset 110 can communicate with the processor 102 and can control interaction with the memory 112, interaction with bus 120, which can be a PCI bus, and interactions with bus 124 which can be a PCI bus or an AGP bus. The Northbridge portion can also communicate with the processor 102 using host bus 104 and with the processor 106 using the host bus 108. The chipset 110 can also include a Southbridge portion that can handle I/O functions of the chipset 110. The Southbridge portion can manage the basic forms of I/O such as USB, serial I/O, audio outputs, Integrated Drive Electronics (IDE), and ISA I/O for the information handling system 100.

The information handling system 100 can further include a disk controller 132 connected to the bus 120. The disk controller 132 can be used to connect one or more disk drives such as a hard disk drive (HDD) 134 and an optical disk drive (ODD) 136 such as a Read/Write Compact Disk (R/W-CD), a Read/Write Digital Video Disk (R/W-DVD), a Read/Write mini Digital Video Disk (R/W mini-DVD), or other type of optical disk drive.

In a particular form, the information handling system 100 includes a BIOS 142 that can be updated using a BIOS menu and the embodiments described below. The BIOS 140 can include selectable BIOS options that can be modified by a user and stored within an updateable BIOS memory. The BIOS 140 can be accessed using the display 126 and a keyboard 148.

Figure 2:
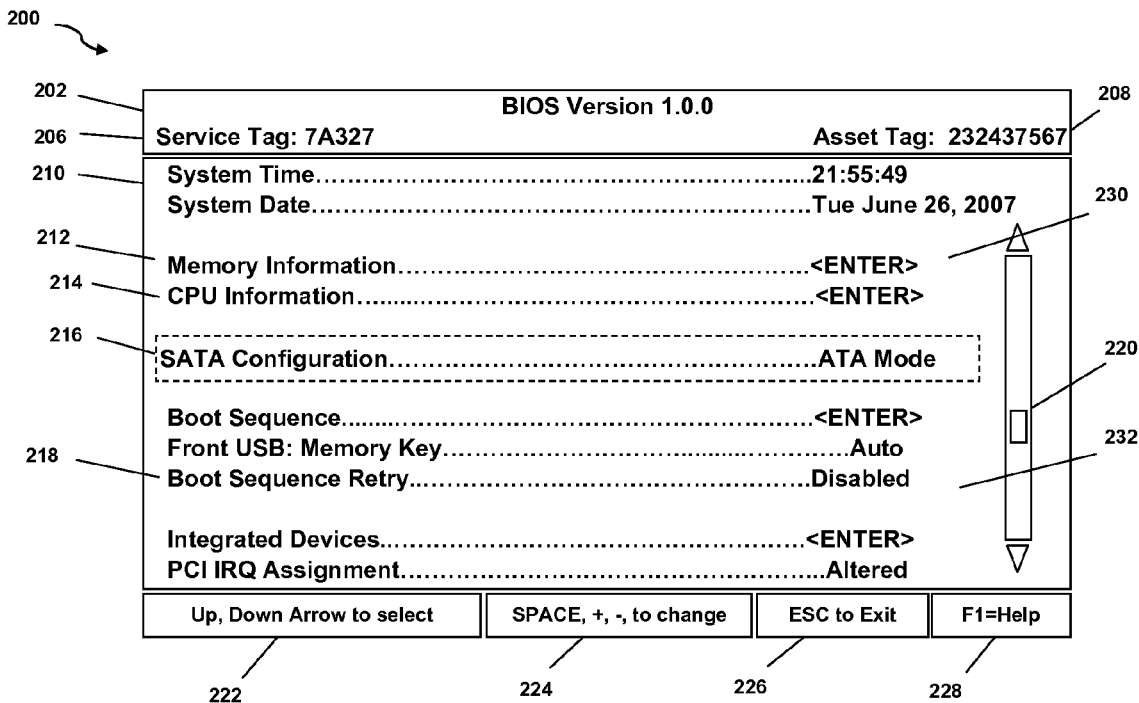
FIG. 2 illustrates a basic input output system (BIOS) set-up menu according to an aspect of the disclosure.

FIG. 2 illustrates a BIOS set-up interface, illustrated generally at 200, according to an aspect of the disclosure. The BIOS set-up interface 200 includes a BIOS version section 202 that includes a service tag identifier 206 and an asset tag identifier 208. The BIOS set-up interface 202 further includes a BIOS set-up menu 210 operable to display various selectable options that can be updated by a user. For example, the BIOS set-up menu 210 can include a memory information option 212, a CPU information option 214, a SATA configuration option 216, and a Boot sequence retry option 218. Various other options can also be displayed using a scroll bar 220. It should be understood that numerous combinations of set-up options can be accessed depending on the diversification of an information handling system. As such, the BIOS set-up menu 210 and options presented are not limited to those options displayed within FIG. 2.

The BIOS set-up menu 210 also includes a navigation access descriptor 222 describing the "up" and "down" arrow of a keyboard as being active to enable moving a selector between option fields. For example, the SATA configuration 216 includes a dashed outline indicating that the SATA configuration 216 is currently highlighted and can be changed by a user. As such, as the user depresses an "up" arrow on a keyboard, the highlighted region will move to the next region above the SATA configuration 216. Likewise, as a user depresses a "down" arrow on the keyboard, the highlighted region will move to the next entry below the SATA configuration 216.

The BIOS set-up menu also includes a navigation access descriptor 222 describing the ""space", "+", and "−" keys of a keyboard as being active to enable changing the value of the highlighted field. For example, selecting the "space" bar can alter an "On/Off" option, "Enable/Disable" option, "Activated/Deactivated" option, or various other options that may include two selections. The "+" and "−" keys can be used to increase or decrease a value of an option. For example, if multiple options are selectable, the options can be navigated by using the "+" and "−" keys. Various other combinations or values can be used.

The BIOS set-up menu 210 further includes a navigation access descriptor 226 describing the "escape" key of a keyboard as being active to enable exiting the BIOS set-up menu 210. The BIOS set-up menu 210 also includes the navigation access descriptor 222 describing the "F1" key of a keyboard as being active to enable a help menu.

Figure 3:
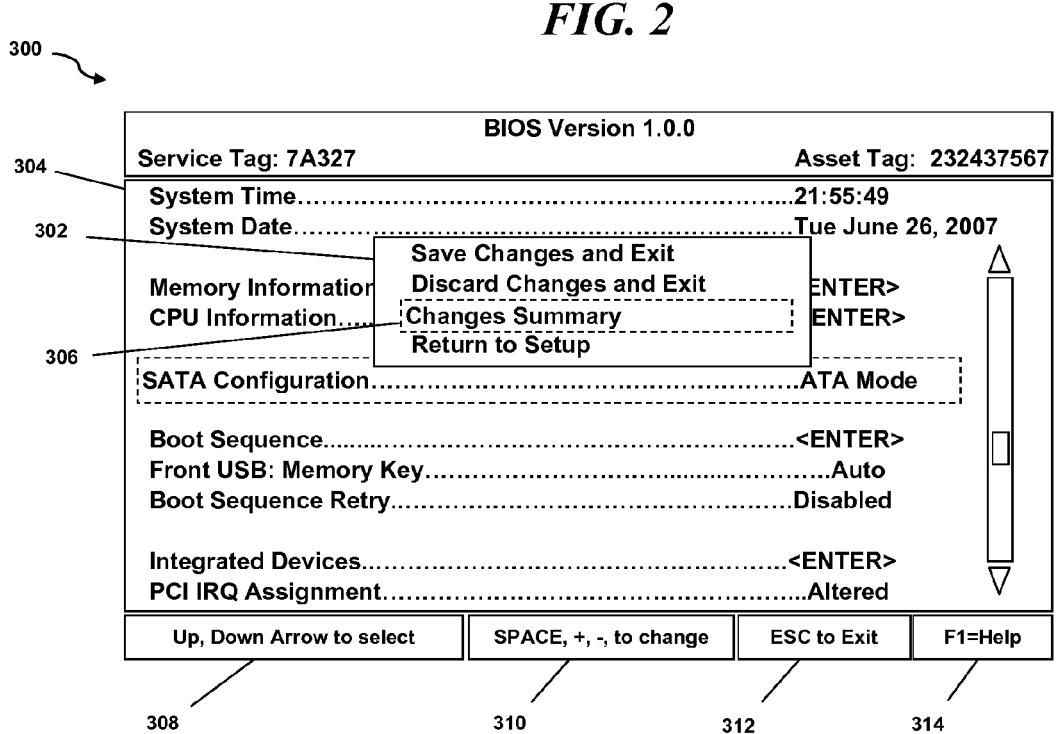
FIG. 3 illustrates a BIOS set-up menu incorporating a secondary user display according to an aspect of the disclosure.

FIG. 3 illustrates a BIOS set-up menu, illustrated generally at 300, incorporating a secondary user display 302 according to an aspect of the disclosure. The secondary user display 302 can include multiple navigation functions to navigate between display windows and functions of the BIOS set-up menu 300. For example, the secondary user display 302 can include a "Saves Changes and Exit" function, a "Discard Changes and Exit" function, a "Changes Summary" function, and a "Return to Setup" function. Navigation functions can be added or removed as needed or desired.

Figure 4:
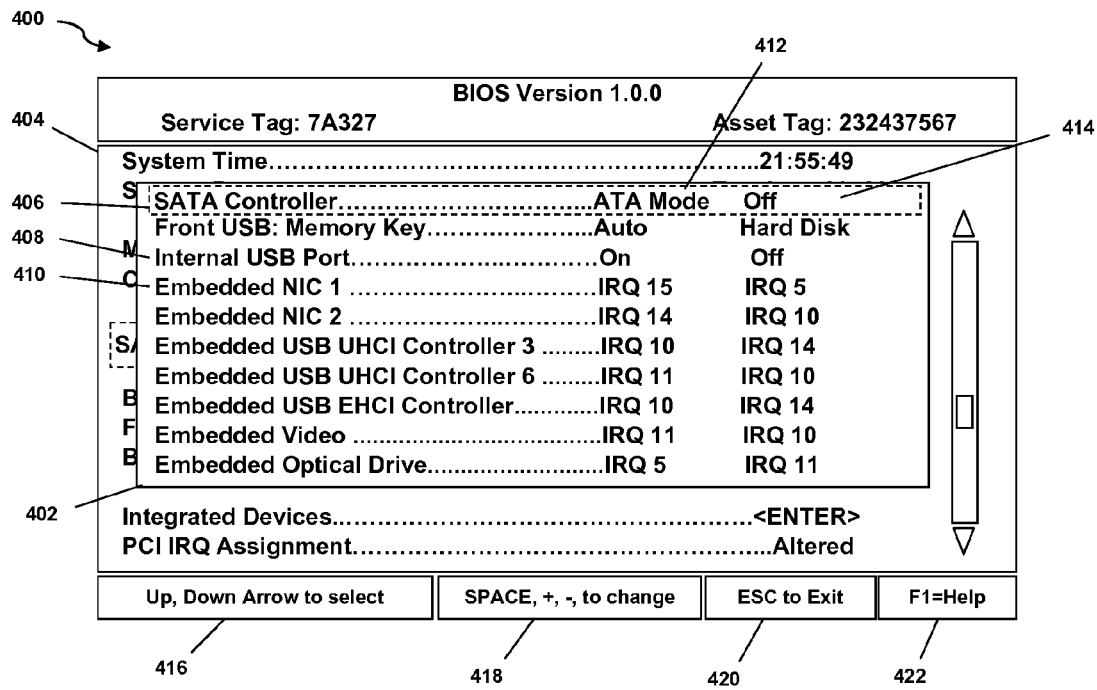
FIG. 4 illustrates a BIOS change summary interface displayed with a BIOS set-up menu according to an aspect of the disclosure.

According to one aspect, the "Save Changes and Exit" function initiates storing the current changes made within the BIOS set-up menu 300 to a BIOS set-up stored within a memory. Upon saving the current changes, the BIOS set-up menu 300 exits. The "Discard Changes and Exit" function initiates removing or discarding any changes that were made to the BIOS set-up during the current session. The "Change Summary" function initiates display of only the current options that have been selected to be changed. FIG. 4 below illustrates one embodiment of a BIOS change summary interface. The BIOS set-up menu 400 also includes navigation elements 308-314 that include the same functions as described in FIG. 2 above. The secondary user display 302 includes a highlighted region to enable selection of a specific function. For example, the changes summary function 306 is highlighted. As such, a user can select the "space" bar to activate the changes summary function and access the changes summary interface.

FIG. 4 illustrates a BIOS set-up menu 400 including a BIOS change summary interface 402 according to an aspect of the disclosure. The BIOS change summary interface 402 can be displayed in response to a user selecting the changes summary function 306 illustrated in FIG. 3 above. The BIOS change summary interface 402 can include a highlighted entry 406 such as a SATA Controller option entry. Additional entries, such as an Internal USB Port option entry 408, an embedded NIC 1 option entry 410, and a list of all other options modified during the current BIOS option set-up session. The BIOS change summary interface 402 also includes a new option value entry and a previous option value entry. For example, the SATA controller option entry 406 includes a new value of "ATA Mode" and a previous value of "Off". Similarly, the Internal USB Port includes a new value of "On" and previous value of "Off".

In a particular form, a current value column 412 of the summary interface 402 highlights a new value of each modified entry. Additionally, a previous value column 414 of the summary interface 402 can highlight a previous value of each modified entry. Other combinations of highlighting or other graphical enhancements can be used to identify new and previously entered values or data. In one form, the current value column 412 includes values that can be modified. Additionally, the previous value column 414 can include values that are read only and cannot be modified.

In other forms, the change summary interface 402 can be positioned along various portions of the BIOS option set-up menu 400 and is not limited to the position illustrated in FIG. 4. Additionally, a "hot-key" can be used in association with the BIOS option set-up menu 400 to enable and disable access to the change summary interface 402.

In one form, a user can move the highlighted entry 406 and can alter a value. For example, a user may not have intended to alter the Embedded NIC 1 option entry 410. As such, a user can select the "down" key to highlight the Embedded NIC 1 option entry 410, and can further select the "space", "+", or "−" keys to obtain a desired entry. In this manner, a user need not exit the summary menu alter an entry. A user can further use the "up" and "down" arrows to access each option modified. In one form, a scroll bar can also be provided to indicate additional entries within the BIOS change summary interface 402. Upon a user reviewing the changes, a user can select the "ECS" key to exit the BIOS change summary interface 402 and navigate to the secondary user display 302 described in FIG. 3 above.

Figure 5:
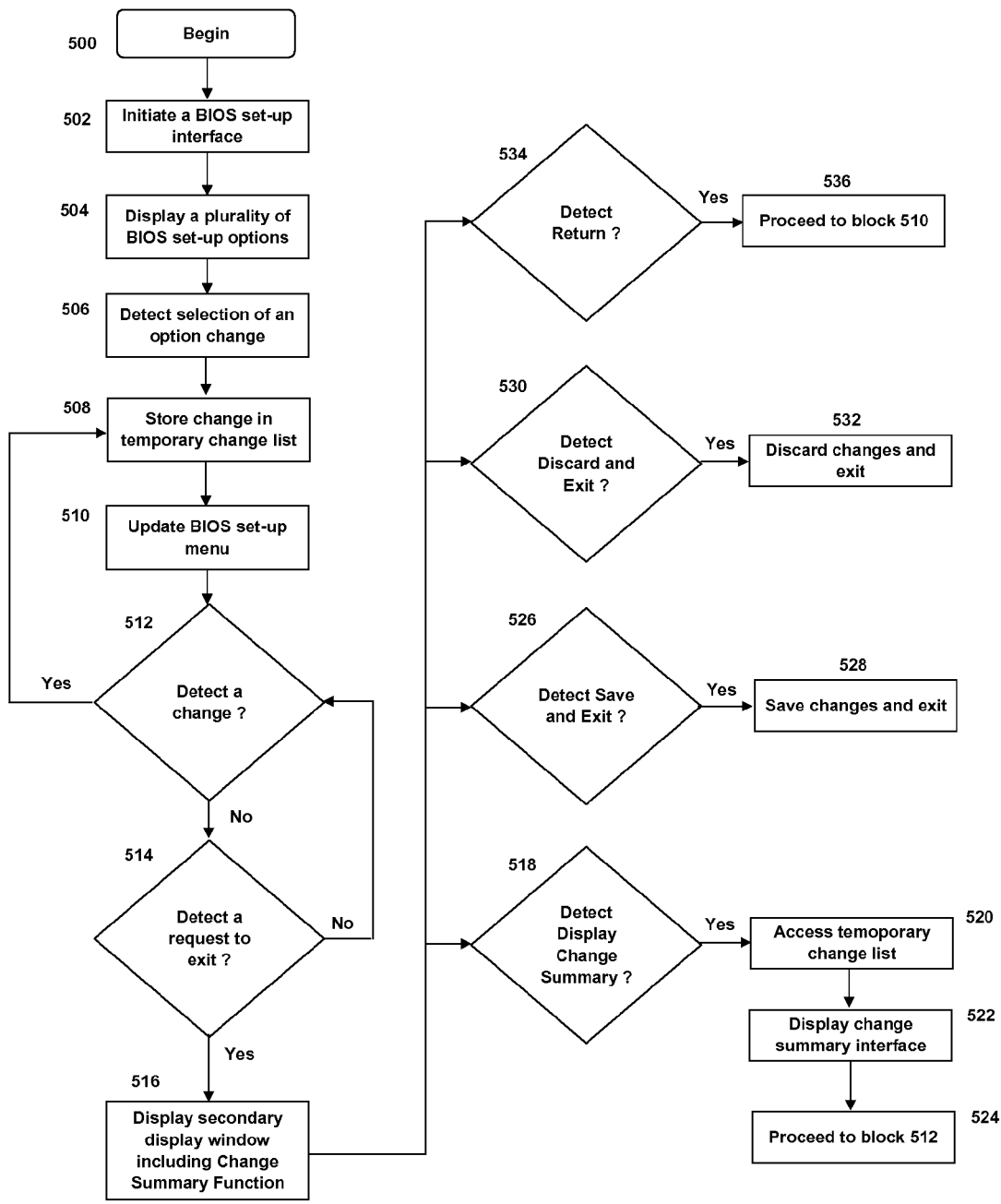
FIG. 5 illustrates a flow diagram describing a method of updating a BIOS set-up according an aspect of the disclosure.

FIG. 5 illustrates a flow diagram describing a method of updating a BIOS set-up according an aspect of the disclosure. FIG. 5 can be employed in whole, or in part, by the information handling system 100 depicted in FIG. 1, or any other type of system, controller, device, module, processor, or any combination thereof, operable to employ all, or portions of, the method of FIG. 5. Additionally, the method can be embodied in various types of encoded logic including software, firmware, hardware, or other forms of digital storage mediums, computer readable mediums, or logic, or any combination thereof, operable to provide all, or portions, of the method of FIG. 5.

The method begins generally at block 500. At block 502, access to a BIOS set-up interface can be initiated. At block 504, a plurality of BIOS set-up options can be displayed within a display such as illustrated in FIG. 3 above. Other options can also be displayed. The method can then proceed to block 506, and detects when a user selects to a set-up option to change, and to block 508 and stores the change within a temporary change list. For example, a temporary change list can be used to store current changes, and the display can be updated at block 510 to illustrate a current change made by the user. The method can then proceed to decision block 512 and detects whether a change has been made. If an additional change has been made, the method proceeds to block 508 and repeats.

If at decision block 512, an additional change may not be made, the method can proceed to block 514 and detects where a request to exit the BIOS set-up menu has been detected. If a request is not detected, the method can proceed to decision block 512 and repeats. If at decision block 514 a request to exit is detected, the method can proceed to block 516 and a secondary display window can be displayed with the BIOS set-up menu. In one form, the secondary window can include several functions such as a change summary function, a save and exit function, a discard and exit function, and a return function. Various combinations of functions can be added or removed as needed or desired.

The method can then proceed based on a function selected by a user. For example, if a user selects the display change summary function, the method can proceed to block 518. Upon detecting the display summary function selection, the method can proceed to block 520 and accesses the temporary change list that includes each of the selected options that have been changed. The method can then proceed to block 522 and displays the selected options that have been changed within a change summary interface. In this manner, a user can view the current changes, and the method can proceed to block 524, and to block 512. A user can then select or deselect changes made and updated accordingly.

If a user selects a save and exit function from the secondary display window, the method can proceed to block 526 and to block 528 where the current changes are saved to the BIOS set-up stored within memory. The BIOS set-up menu then exits or closes. If a user selects a discard and exit, the method can proceed to block 530 and to block 532 and discards the current changes. As such, a previous BIOS set-up will be used and changes made by the user will be deleted. If a user selects a return function, the method can proceed to block 534 and to block 536. The method can then proceed to block 510 and a user can access the BIOS set-up menu and make additional changes.

Note that not all of the activities described above in the general description or the examples are required, that a portion of a specific activity may not be required, and that one or more further activities may be performed in addition to those described. Still further, the order in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A basic input output system (BIOS) set-up interface comprising:
    a navigation routine accessible via a BIOS set-up menu wherein the navigation routine displays a secondary user display interface comprising a changes summary functional element; and
    a BIOS change summary interface accessible by selecting a hot key that accesses the changes summary functional element of the secondary display user interface, wherein the BIOS change summary interface:
        displays a current value for a particular BIOS set-up change made using the BIOS set-up menu, and a previous value for the particular BIOS set-up change;
        highlights the particular BIOS set-up change; and
        alters the particular BIOS set-up in response to a user input.

2. The BIOS set-up interface of claim 1, wherein:
    the BIOS set-up menu includes a plurality of selectable BIOS set-up options; and
    the BIOS change summary interface displays only a summary of the BIOS set-up changes made using the BIOS set-up menu.

3. The BIOS set-up interface of claim 2, wherein the particular BIOS set-up is stored within a BIOS memory.

4. The BIOS set-up interface of claim 1, wherein the navigation routine includes a BIOS set-up menu exit interface comprising:
    a save changes and exit functional element;
    the changes summary functional element; and
    a return to set-up functional element.

5. The BIOS set-up interface of claim 1, wherein the navigation routine includes a BIOS set-up menu exit interface comprising:
    a discard changes and exit functional element;
    the changes summary functional element; and
    a return to set-up functional element.

6. The BIOS set-up interface of claim 1, wherein the navigation routine includes a BIOS set-up menu exit interface comprising:
    a save changes and exit functional element;
    a discard changes and exit functional element;
    the changes summary functional element; and
    a return to set-up functional element.

7. The BIOS set-up interface of claim 1, wherein the BIOS change summary interface enables a user to deselect a BIOS set-up change made using the BIOS set-up menu.

8. The BIOS set-up interface of claim 7, further comprising a change agent that detects a change made via the BIOS change summary interface and to initiate altering a BIOS set-up using the detected change.

9. The BIOS set-up interface of claim 8, wherein:
    the BIOS set-up includes changes made via the BIOS set-up menu and the BIOS change summary interface; and
    the BIOS set-up is accessible during an initialization routine of an information handling system.

10. A method of modifying a basic input output system (BIOS) set-up comprising:
    displaying a plurality of BIOS set-up options within a BIOS set-up menu;
    detecting selection of a first option change using the BIOS set-up menu, wherein the first option change results in a change of the first option from an old option value to a new option value;
    detecting a first request to enter a secondary selection window, the secondary selection window including a changes summary functional element;
    displaying the secondary selection window with the BIOS set-up menu;
    detecting a selection of a hot key associated with the BIOS change summary function;
    accessing a listing including the first option change in response to detecting the selection of the hot key; and
    displaying the first option change, wherein the displaying includes displaying both the old option value and the new option value.

11. The method of claim 10, further comprising:
    enabling selection of the first option change within a BIOS change summary interface; and
    detecting a de-selection of the first option change.

12. The method of claim 11, further comprising:
    detecting a selection of a second option change made within the BIOS set-up menu;
    updating the BIOS set-up to include the second option change; and
    not updating the BIOS set-up to include the first option change.

13. The method of claim 11, further comprising:
detecting a first plurality of option changes made via the BIOS set-up menu;
detecting a second plurality of option changes made via the BIOS change summary interface; and
displaying the first plurality of option changes and the second plurality of option changes within the BIOS change summary window.

14. The method of claim 13, further comprising:
detecting selection of a save BIOS change settings function;
saving the first plurality of changes; and
saving the second plurality of changes.

15. The method of claim 13, further comprising:
enabling access to the BIOS set-up during initialization of an information handling system; and
initializing the information handling system using the first plurality of changes and the second plurality of changes.

16. An information handling system comprising:
a processor to enable use of selected BIOS options configurable by a user;
a BIOS set-up stored within a memory accessible to the processor, the BIOS set-up including the selected BIOS options; and
a BIOS set-up interface that enables access to the selected BIOS options using a hot key for accessing a BIOS change summary interface, and that enables a user to deselect a BIOS set-up change made using the BIOS set-up menu, wherein the BIOS change summary interface is accessed via a changes summary functional element of the BIOS set-up interface, and the BIOS change summary interface:
  displays a current value for a particular BIOS set-up change made using the BIOS set-up menu, and a previous value for the particular BIOS set-up change;
  highlights the particular BIOS set-up change; and
  alters the particular BIOS set-up in response to a user input.

17. The information handling system of claim 16, wherein the BIOS set-up interface further includes:
a navigation routine accessible via a BIOS set-up menu, wherein the navigation routine initiates displaying a secondary user display interface; and
wherein the BIOS change summary interface is accessible using the secondary display user interface, and further wherein the BIOS change summary interface displays the selected BIOS options selected using the BIOS set-up menu.

18. The information handling system of claim 16, wherein the BIOS change summary interface further comprises a change agent that detects a change made via the BIOS change summary interface, and that initiates altering the BIOS set-up using the detected change.

19. The information handling system of claim 18, further comprising a navigation routine including a BIOS set-up menu exit interface comprising:
a save changes and exit functional element;
a discard changes and exit functional element;
the changes summary functional element; and
a return to set-up functional element.

* * * * *